Nov. 12, 1968     E. W. MADSEN ETAL     3,411,058

ACCELERATION DECELERATION CONTROL CIRCUIT FOR A STEPPING MOTOR

Filed Jan. 19, 1965

INVENTORS
Elmer W. Madsen
Albert C. Leenhouts
BY
Johnson and Kline
ATTORNEYS

United States Patent Office

3,411,058
Patented Nov. 12, 1968

3,411,058
ACCELERATION DECELERATION CONTROL
CIRCUIT FOR A STEPPING MOTOR
Elmer W. Madsen, Bristol, and Albert C. Leenhouts,
Granby, Conn., assignors to The Superior Electric Company, Bristol, Conn., a corporation of Connecticut
Filed Jan. 19, 1965, Ser. No. 426,633
9 Claims. (Cl. 318—138)

ABSTRACT OF THE DISCLOSURE

A motor control circuit for a stepping motor that supplies a train of pulses to the motor with each pulse producing an incremental movement in which the pulses are derived for a variable frequency oscillator whose frequency is increased for the initial pulses of the train and decreased for the terminal pulses of the train.

---

Figure 1:
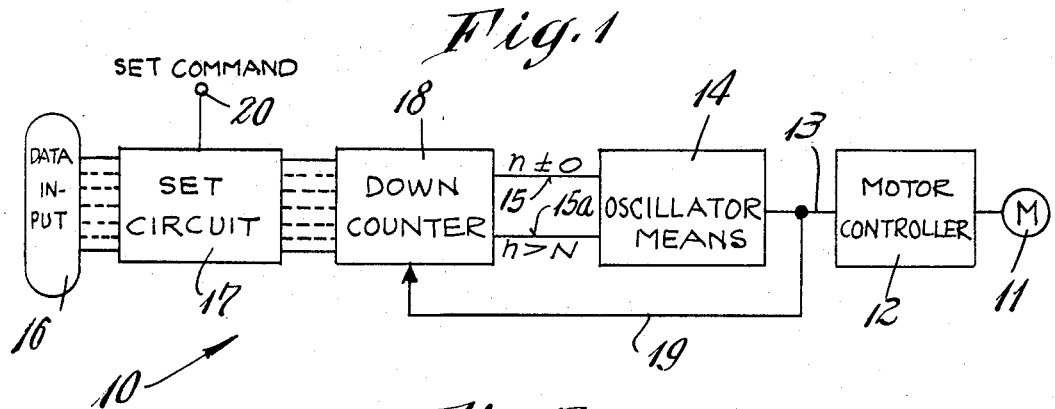

In U.S. patent application Ser. No. 291,074, filed June 27, 1963, now Pat. No. 3,241,017 by the inventors of the instant application and assigned to the assignee of the present application, there is disclosed a control circuit for a stepping motor in which the stepping motor is caused to move a desired movement by the control circuit. The stepping motor moves one increment for each pulse supplied thereto and thus by determining the number of increments of movement or steps in the total desired movement and then supplying the same number of pulses to the motor, it can be caused to move the desired movement.

While such a circuit has been found satisfactory, it has been found that difficulties have arisen in attempting to increase the speed of movement of the motor, particularly when it is desired to move larger inertial loads at higher speeds without loss of a step. Thus while the motor may be capable of starting and/or stopping a high inertial load with absolute control over the movement of the load at a low speed, such a speed has been found to be much lower than that at which the motor could operate at other than the ends of its movement and still maintain control, i.e. always translate a pulse into a step and not take a step without a pulse. Accordingly, the heretofore described circuit has been incapable of fully utilizing the capabilities of the motor by its failure to enable the motor to be operated at a faster speed during the intermediate portion of the movement and still retain its capabilities of starting and stopping higher inertial loads.

It is an object of the present invention to provide a control circuit for a stepping motor which enables the motor to be operated at a faster speed during a desired movement than heretofore possible and still maintain absolute control over the load that it moves.

Another object of the present invention is to provide a control circuit for a stepping motor which enables the motor to be operated at more nearly its maximum capabilities by enabling it to start, move and stop higher inertial loads than heretofore possible.

A further object of the present invention is to achieve the above objects with a motor to which only a minimum number of parts are required, which may be incorporated into presently utilizable control circuits and which is reliable in use.

In carrying out the present invention there is provided a control circuit and motor similar to the circuit disclosed in the above-noted application. As disclosed therein, the motor is of the stepping type in which a change in energization of its windings, herein referred to as a pulse, causes the motor to advance in one direction or another a known movement and if the motor is of the rotating type, a known number of degrees. By providing a train of pulses containing a selected number of pulses, the extent of movement is thus determinable and as the motor moves one increment with every pulse supplied thereto, it is essential that the motor be capable of responding only to the pulse and not be rendered ineffective by external factors such as the mechanical load which it is operating to cause movement without a pulse. The pulses are produced by an oscillator means and in order to enable the user to select the number of pulses to be supplied, there is a pulse number selecting means together with a counting means which, when the two coincide in number, ceases the application of pulses to the motor. The train of pulses is delivered by the oscillator means at a constant frequency and hence the motor moves at a constant speed.

In accordance with the present invention while a similar type circuit and motor is employed, the train of pulses is delivered to the motor at different frequencies which enables the motor to control higher inertial mechanical loads at a faster speed. Thus, the first few pulses of the train to the motor are supplied at a low frequency which causes the motor to move slow with a relatively large torque and then the frequency is gradually increased with each pulse supplied to the motor. Thus the speed of the motor is caused to increase at a rate which causes the motor to maintain control over the load until it achieves a relatively high speed which it maintains for most of the train of pulses until there is sensed only a few pulses remaining in the train. Then the motor is decelerated for the last few pulses of the train by supplying these pulses to the motor at a decreasing frequency. Thus the motor control circuit provides an acceleration and a deceleration of the motor at a changing rate of acceleration and deceleration, thus enabling the motor to accurately control higher inertial starting and terminal loads and yet still have a high speed for a substantial portion of its movement.

Figure 2:
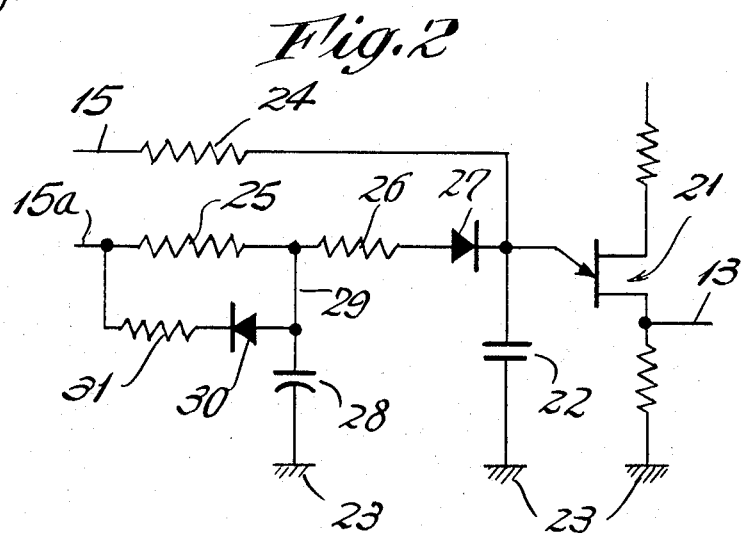

Other features and advantages will hereinafter appear.
In the drawing:
FIGURE 1 is a bock diagram of the motor control circuit of the present invention.
FIG. 2 is a schematic diagram of an oscillator means whereby the frequency of the pulses may be changed.

Referring to the drawing, the control circuit of the present invention is generally indicated by the reference numeral 10 and includes a motor 11 of the stepping type. Connected to the motor 11 is a motor controller 12. The controller 12 and motor 11 are more fully described in U.S. Patent No. 3,117,268 and it will be appreciated that a pulse on the line 13 to the controller causes the motor controller 12 to energize the motor 11 in such a manner that the motor is caused to move one incremental movement. One revolution of a motor 11 of the rotary type may require, depending upon the motor construction, perhaps 200 incremental movements or steps.

The line 13 on which pulses appear is connected to the output of an oscillator means 14 which, as will be hereinafter more fully described, may be generally termed a relaxation or saw-tooth oscillator. Two leads 15 and 15a are connected to the input of the oscillator means 14.

As it is desired to cause the motor 11 to move a predetermined movement, there must be transmitted over the line 13 a train of pulses having the exact number of pulses which produces the movement.

In the specific embodiment shown herein, the number of pulses is derived from a data input means 16 which may be a tape reader reading a tape on which the number is punched or otherwise indicated together with a set circuit 17 which may consist of a plurality of decade or binary counters. The set circuit functions to store the information derived from the data input means 16 which consists of the number of pulses the motor is to receive. The set circuit 17 is connected to a down counter 18 which again may consist of a decade or binary counter of the type having a plurality of conditions, one for each pulse. For changing the condition of the down counter for each pulse, there is a connection 19 from the line 13 thereto such that every pulse applied to the motor controller 12 and hence the motor is also applied to the down counter to change its condition. The down counter 18 is connected by leads 15 and 15a to the oscillator means 14 and upon the down counter achieving a zero count, a signal appears on the lead 15 which ceases the oscillation of the oscillator means and accordingly the application of pulses to the motor controller and motor.

Thus in the operation of the above control circuit the data input means 16 applies to the set circuit 17 information consisting of the number of pulses to be supplied to the motor and upon a set command being applied as at 20 as by closure of a switch, the down counter 18 is caused to assume the same condition as the set counter and thus have both contain therein the number of pulses which are to be supplied to the motor.

Upon actuation of the circuit, the oscillator means begins operating and supplies through the line 13 to the motor controller and motor, a train of pulses that causes the motor to move at a rate determined by a frequency of the pulses. In addition, the connection 19 supplies to the down counter each pulse supplied to the motor and causes the down counter to change its condition from its present condition with each pulse to store the number of pulses remaining in the train. Upon the down counter achieving the zero state or condition, a signal is transmitted over the lead 15 to the oscillator means which causes the oscillator means to cease functioning thereby stopping the motor.

In accordance with the present invention in order to enable the motor to either operate faster during the intermediate portions of its movement or to control higher inertial loads with a minimum decrease in average speed or a combination of both, it has been found that these results could be achieved by initially starting the motor at a lower speed and gradually increasing its speed until it achieves, within for example 20 pulses, a high speed for the intermediate portion of its movement. Moreover, to prevent the kinetic inertia of the load from controlling the motor during the end portion of movement, the present invention also provides for, prior to the motor achieving the end of its movement, for example again twenty steps before its terminal step, the speed of the motor to be gradually decreased. Thus at no time is the speed of the motor abruptly changed which could cause the motor to not accurately and assuredly respond to every pulse and make no movement without a pulse. With this concept and the herein disclosed circuit, the motor may start at 100 steps a second, accelerate to 500 steps per second and remain at 500 steps until decelerated to 100 where it is stopped. The example of twenty steps for acceleration and twenty steps for deceleration enables the motor for a train of pulses greater than 40 to be driven at a relatively fast speed.

Referring to FIG. 2, the electrical schematic diagram of the oscillator means, there is provided a unijunction transistor 21 having the line 13 connected to one of its bases while a condenser 22 is connected between its emitter and a ground 23. Also connected to the emitter through a resistance 24 is the lead 15 while the lead 15a also connects to the emitter through a resistance 25, another resistance 26 and a diode 27. It will be appreciated that at other than zero condition of the down counter 18, the lead 15 is positive and will supply current to the condenser 22 causing the potential thereacross to increase at a determined rate. The potential will increase in value until it achieves a value which is sufficient to cause conduction between the two bases of the unijunction transistor and provide a pulse on the line 13. Naturally the more current that is supplied to the condenser, the faster it will achieve a value sufficient to cause the transistor 21 to conduct.

The lead 15a is also positive and is connected to supply to the condenser 22 a charging current. The lead 15a however rather than being connected to the zero condition of the down counter, as is the lead 15, is connected to a condition of the down counter which represents a known number of pulses remaining in the down counter before the zero condition. In the example given the number is twenty pulses. Accordingly, the lead 15a is positive at all conditions of the down counter except for those conditions which indicate that there are less than the known number of pulses remaining to be supplied to the motor.

Also connected to the lead 15a is the positive side of a condenser 28 by a lead 29 while the negative side is connected to the ground 23. In addition a bypass path consisting of a diode 30 and a resistor 31 connects the positive side of the condenser 28 to the lead 15a.

Assuming that the down counter has been set to the condition corresponding to the condition to which the set circuit has been set and the latter being determined by the data input means, the set command is actuated to start the train of pulses. The leads 15 and 15a are now positive and thus current may flow through both of them. For the first pulse current flows through the lead 15 to the condenser 22 and also may flow through the lead 15a. However, as both condensers 22 and 28 are discharged, the current in the lead 15a may flow either to the condenser 28 or through the resistor 26 and diode 27 to the condenser 22.

The resistance 24 is relatively high compared to the value of the resistances 25 and 26 and thus the value of the current through the lead 15 is much smaller than the current capable of being passed through the lead 15a. In addition, the condenser 28 has a higher value of capacitance than the condenser 22. Thus for the first pulse a constant value of small current flows through the lead 15 to the condenser 22 while a much larger value of current appears in the lead 15a but by reason of the impedances presented by the elements 26 and 27, the lead 15a current prefers to traverse lead 29 and charge the condenser 28.

After a short time however the condenser 22 has been changed by the current from the lead 15 and will cause conduction between the bases of the transistor 21 producing the first pulse of the train on the line 13.

For the next pulse it will be understood that the condenser 28 is slightly charged and hence it has a greater reluctance to accepting current from the lead 15a than during the first pulse and thus a small portion of the current in lead 15a may be conducted to the condenser 22 which will cause the condenser 22 to become charged to the potential necessary to effect conduction of the transistor 21 in a slightly shorter time than for the first pulse. Thus the interval between the the second pulse and first pulse will be a little shorter than the interval between the first pulse and the initiation of the train.

For the third pulse the condenser 28 shows more reluctance than previously for accepting current and accordingly will divert more current to the condenser 22 causing again a shorter duration to charge the condenser 22 to the desired level which for the third pulse increases the frequency of the pulses. Similarly for each succeeding pulse the condenser 22 will receive more of the current from the lead 15a and be charged sooner until, depending upon the value of the components, the condenser 28 is fully charged to a substantially constant potential that has a value which prevents any more charging at which time for all subsequent pulses when both leads are positive, the condenser 22 receives all the current from both the leads 15 and 15a and delivers at a substantially constant frequency, pulses to the motor controller.

Upon the down counter having reached the condition that indicates that there is only a known number of pulses remaining in the train as for example twenty, then the lead 15a changes from a condition of being positive to a ground condition, i.e. in effect becomes connected to the ground 23. Current may thus flow from the condenser 28 which has a potential thereacross through the elements 30 and 31 to ground and also through the resistance 26 and diode 27 to the condenser 22. Thus for the nineteenth pulse current is received by the condenser 22 from the lead 15 and also from the condenser 28. However, the condenser 28 through the bypass path is gradually discharging its current therefore reducing its potential and with each succeeding pulse it adds less to the charging of the condenser 22 than it previously had until at approximately the end or last pulse of the train, the condenser 28 is fully discharged and the frequency of the last pulse is the frequency determined by the current delivered solely by the lead 15.

It will be appreciated with the above that the extent of the acceleration may be easily controlled by varying the values of the components so that the frequency of the pulses may be increased from the beginning pulse for any desired number of pulses thereafter and thus while reference is made to the number twenty pulse as being the pulse at which the motor achieves a substantially constant speed any other number found desirable may be utilized. Moreover, it will also be appreciated that by connecting the lead 15a to a condition of the down counter indicative of any number of pulses remaining in the train, that the deceleration may begin at any desired number of pulses remaining in the train.

Also it will be understood that the values of the condensers 22 and 28 and the values of the other elements may be altered to vary the rate at which the frequency of the initial pulses and remaining pulses are supplied. Also, if desired, the first few beginning pulses may be at a constant frequency determined by current from the lead 15 and with the frequency beginning to be increased after, for example the fourth pulse. Moreover, the values of the components may be selected to provide that the last few pulses of the train also be at the frequency set solely by the lead 15.

Upon the terminal pulse being transmitted over the line 13, the lead 15 has its potential reduced to ground and hence further supplies no current to the condenser 22. This stops the unijunction transistor 21 from conducting and in turn prevents the appearance of any further pulses on the line 13.

It will accordingly be appreciated that there has been disclosed a control circuit for a stepping motor which during one determined movement causes the motor to be moved at different speeds to most efficiently utilize the motor's capabilities. The motor is initially started at a slow speed and subsequently the speed of the motor is increased and this is achieved by increasing the frequency of the subsequent pulses that are translated into an incremental movement or step of the motor. After a number of pulses of increasing frequency, the motor is made to run at a substantially constant speed much higher than the initial starting speed until a known number of pulses remain in the train to be supplied to the motor. The motor is decelerated by decreasing the frequency of the subsequent pulses until at least the last pulse of the train is at a low frequency. Thus the acceleration and deceleration of the motor is gradually changing if not with every pulse, at least substantially therewith and with graduations in motor speed which enables the motor to have absolute control over a high inertial load and thus translate every pulse into a step and not move in the absence of a pulse.

Variations and modifications may be made within the scope of the claims and portions of the improvements may be used without others.

We claim:

1. A motor control circuit for a stepping motor for supplying electrical energy in the form of a train of pulses to said motor with each pulse producing an incremental movement of the motor comprising means for selecting the number of pulses in the train to be supplied to the motor to provide the desired movement, oscillator means for producing the pulses and including means for changing the frequency of the pulses, means for receiving the pulses from the oscillator means and supplying them to the motor, means for counting the pulses supplied to the motor, means for sensing the initiation of the train of pulses and the number of pulses left to be supplied to the motor and means interconnecting the sensing means to the frequency changing means for increasing the frequency of the pulses of at least a number of pulses just subsequent to the initial pulse of the train and for decreasing the frequency of the pulses of at least a number of pulses just prior to the last pulse of the train.

2. A motor control circuit for a stepping motor for supplying electrical energy in the form of a train of pulses to said motor with each pulse producing an incremental movement of the motor comprising means for selecting the number of pulses in the train to be supplied to the motor to provide the desired movement, oscillator means for normally producing the pulses at a selected frequency and including means for decreasing the frequency of the pulses, means for receiving the pulses from the oscillator means and supplying them to the motor, means for counting the pulses supplied to the motor, means for sensing the initiation of the train of pulses and the number of pulses left to be supplied to the motor and means interconnecting the sensing means to the frequency changing means for increasing the frequency at each subsequent pulse of at least a number of pulses just subsequent to the initial pulse of the train from a lower frequency to a higher frequency until the selected frequency of pulses is achieved and for decreasing the frequency at each subsequent pulse of at least a number of pulses just prior to the last pulse of the train from the selected frequency to a lower frequency.

3. A motor control circuit for a stepping motor for supplying electrical energy in the form of a train of pulses to said motor with each pulse producing an incremental movement of the motor comprising means for selecting the number of pulses in the train to be supplied to the motor to provide the desired movement, oscillator means for producing the pulses and including means for changing the frequency of the pulses, means for receiving the pulses from the oscillator means and supplying them to the motor, means for counting the pulses supplied to the motor, means for sensing the initiation of the train of pulses and the number of pulses left to be supplied to the motor and means interconnecting the sensing means to the frequency changing means for decreasing the duration between each subsequent pulse of at least a number of pulses just subsequent to the initial pulse of the train and increasing the duration between each subsequent pulse of at least a number of pulses just prior to the last pulse of the train.

4. The invention as defined in claim 3 in which the last-named means decreases the duration between subsequent pulses as the frequency of the pulses approaches the selected frequency.

5. The invention as defined in claim 3 in which the last-named means increases the duration between subsequent pulses as the frequency of the pulses decreases from the selected frequency to the lower frequency.

6. A motor control circuit for a stepping motor for supplying electrical energy in the form of a train of pulses to said motor with each pulse producing an incremental movement of the motor comprising oscillator means for producing the pulses at a frequency determined by the value of a sum signal and including means for changing the frequency by changing the sum signal, said means including a first signal means continually operative throughout the train of pulses to cause said oscillator means to produce pulses at a lower frequency by supplying a value of the first signal to the oscillator means, second signal means operative to provide a value of a second signal which causes the oscillator means to operate at a higher frequency, means for combining the first and second signals to provide a sum signal, means capable of diverting a lesser amount of said second signal from the combining means with each subsequent pulse supplied to the motor after initiation of the train of pulses and means for receiving the pulses from the oscillator means and supplying them to the motor, whereby the motor for at least a number of pulses just subsequent to the initial pulse of the train is accelerated as less of the second signal is diverted from the second signal means.

7. The invention as defined in claim 6 in which the diverting means includes a condenser and the second signal means signal is a substantially constant value of current, said condenser receiving a lesser amount of current from the second signal for each pulse as it accumulates current to increase the potential difference thereacross.

8. A motor control circuit for a stepping motor for supplying electrical energy in the form of a train of pulses to said motor with each pulse producing an incremental movement of the motor comprising means for selecting the number of pulses in the train to be supplied to the motor to provide the desired movement, oscillator means for producing the pulses at a frequency determined by the value of a sum signal and including means for changing the frequency by changing the sum signal, said means including a first signal means continually operative throughout the train of pulses to cause said oscillator means to produce pulses at a lower frequency by supplying a value of the first signal to the oscillator means, another signal means operative to provide a value of a second signal which causes the oscillator means to operate at a higher frequency, means for combining the first and second signals to provide a sum signal, means upon being actuated for decreasing the value of said another signal to the combining means with each subsequent pulse supplied to the motor just prior to the last pulse of the train of pulses, means for receiving the pulses from the oscillator means and supplying them to the motor, means for counting the pulses supplied to the motor, means for sensing the number of pulses left to be supplied to the motor and means interconnecting the sensing means to the decreasing means of the another signal supplying means to cause said another signal means to be actuated for decreasing the frequency of subsequent pulses of at least a number of pulses just prior to the last pulse of the train.

9. The invention as defined in claim 8 in which the another signal means includes a condenser having a potential thereacross and the decreasing means includes a path for allowing said potential to be gradually reduced.

References Cited

UNITED STATES PATENTS

| | | | |
|---|---|---|---|
| 2,867,724 | 1/1959 | Olson | 318—20.320 |
| 2,927,735 | 3/1960 | Scuitto | 318—20.110 |
| 3,218,535 | 11/1965 | Holthaus et al. | 318—138 |
| 3,328,658 | 6/1967 | Thompson | 318—138 |

ORIS L. RADER, *Primary Examiner.*

G. SIMMONS, *Assistant Examiner.*